Patented Mar. 9, 1948

2,437,533

UNITED STATES PATENT OFFICE 2,437,533

CATALYSTS

Hal C. Huffman, Long Beach, Calif., assignor to Union Oil Company of California, Los Angeles, Calif., a corporation of California No Drawing. Application August 8, 1944, Serial No. 548,633

6 Claims. (Cl. 252—206)

This invention relates to catalysts and catalytic processes for the processing of the various hydrocarbons or hydrocarbon mixtures. The invention also relates to a method for preparing the catalysts. This is a continuation-in-part of application Serial No. 470,027, filed December 24, 1942, and covers the catalyst, the process for the catalytic reforming of hydrocarbons being covered in said parent case and in application Serial No. 548,632 filed August 8, 1944.

More particularly, the invention relates to the catalytic treatment of hydrocarbon stocks such as catalytic desulfurization of petroleum fractions, such as petroleum distillates, residues and crude oils. Further, the invention relates to other catalytic operations for the processing of hydrocarbons such as dehydrogenation, hydrogenation, aromatization, reforming, cracking, polymerization, isomerization of petroleum fractions.

The principal objects of the invention are to provide a catalyst which is comparatively easy to produce, is not easily poisoned, has a long catalytic life and the particles of which are capable of retaining their mechanical strength during use and which at the same time exhibit high catalytic activity for the particular process in which they are employed.

A more specific object of the invention is to provide a catalyst carrier or support containing a material which improves the stability of the catalysts employing this carrier. A further object of the invention is to provide a catalyst of such properties that the catalyst particles originally possesses high mechanical strength and that retains this mechanical strength during usage.

Other objects, features and advantages of the invention will become apparent to those skilled in the art as the description thereof proceeds.

Catalytic cracking, dehydrogenation, hydrogenation, aromatization, desulfurization and reforming of hydrocarbons are well known processes. For these purposes many catalytic agents have been employed with varying degrees of success. Well known catalytic agents for these processes include the oxides or other compounds of the related metals which possess their differentiating electron in the second from the outermost shell. This classification is clearly set forth by W. F. Luder "An improved periodic tabue." Jr. Chem. Educ., 16, 393 (1939), as an elaboration of the periodic arrangement of the elements as proposed by R. L. Ebel "Atomic structure and the periodic table," Jr. Chem. Educ., 15, 575 (1938) and includes scandium, titanium, vanadium, chromium, manganese, iron, cobalt, nickel, copper, zinc, yttrium, zirconium, columbium, molybdenum, masurium, ruthenium, rhodium, palladium, silver, cadmium, lanthanum, hafnium, tantalum, tungsten, rhenium, osmium, iridium, platinum, gold, mercury, actinum, thorium and uranium. The desired compounds of these metals may be produced by an appropriate treatment of the nitrates, sulfates, chlorides, molybdates, vanadates, chromates and other suitable salts by methods well known in the art. Many of these catalytic agents are effective when supported on such carriers as alumina, magnesia, silica, zirconia, titania, thoria, etc.

The oxides or molecular combinations thereof of chromium, molybdenum, cobalt, and vanadium distended on alumina are preferred catalysts for the above precesses. For example, in a process generally described as desulfurization a catalyst composed of approximately 35% by weight of the combined oxides of cobalt and molybdenum distended on approximately 65% by weight of alumina is capable of reducing the sulfur content of a pressure distillate boiling in the range of about 100° F. to about 400° F. and containing approximately 3.4 weight per cent sulfur to approximately 0.01 per cent by weight at a temperature of about 750° F., at a liquid hourly space velocity of about one, and a gauge pressure of about 200 pounds per square inch by passing the vaporized feed through the catalyst bed together with about 3,000 cubic feet of added hydrogen per barrel of feed. Also, in a process generally described as dehydrogenation, a catalyst composed of 5 per cent chromium oxide and 95% alumina is capable of effecting as much as about 28% conversion of normal butane to butenes at a temperature of about 1,050° F. at substantially atmospheric pressure and a space velocity of 15 to 17 volumes of gaseous feed per volume of catalyst per minute. Also, in a process described as aromatization, and more commonly hydroforming, a typical commercially prepared catalyst consisting of about 9% molybdenum oxide and about 91% alumina is capable of increasing the aromatic yield of a naphtha boiling between 200° F. and 280° F. from about 14.3% to about 47.1% by volume, based on the feed, at a temperature of 950° F., at a liquid hourly space velocity of 1 and at a gauge pressure of 100 pounds per square inch with an added 3,000 cubic feet of hydrogen per barrel of feed.

The above described catalysts, while possessing initially high catalytic activities and relatively high mechanical strengths, have relatively short catalytic lives and gradually lose mechanical strength during use and for these reasons must be discarded after comparatively short periods of use. It is known that the decrease in activity and shortness of life of a catalyst are related to the loss in mechanical strength of the catalyst but the reasons for this loss in mechanical strength and methods for preventing it are not thoroughly understood. It has been considered, however, that this loss in particle strength is due to the lack of heat stability of the catalyst and may occur during the use of the catalyst either in the catalyzing stage or more probably to a greater degree in the regeneration stage of the operation, the latter operation usually being carried out at higher temperatures than those employed in the catalyzing stage.

A method of testing the heat stability of a catalyst which has been accepted by the petroleum industry consists of subjecting the catalysts for a period of a few hours to a temperature of about 1,470° F. or higher, and evaluating its activity and determining the physical changes. Many catalysts of the types described above are known to lose mechanical strength in the test and it has been found that in general those catalysts which fail to maintain their mechanical strength upon calcination show a decrease in catalytic activity approximately proportional to their loss in strength, and conversely those catalysts which do not suffer an appreciable loss in mechanical strength will retain their catalytic activity. Even more important is the fact that these catalysts which lose their mechanical strength in the calcining test are found to have relatively short catalytic lives and break down in the reactor beds with consequent production of large quantities of fines which are detrimental to the proper functioning of the catalyst bed, necessitating too frequent replacement of the catalyst. Conversely, those catalysts which are found to retain their mechanical strength in the calcining test are also found not only to have long catalytic lives but do not break down into fines during normal use in the catalytic process.

For example, a fresh sample of the particular, commercially prepared catalyst of the hydroforming type referred to above, after calcining at 1,470° F. for six hours, became very soft and powdered easily when rubbed between the fingers. Moreover, the calcining treatment obviously destroyed the activity of the catalyst as indicated by the fact that when a portion of the calcined catalyst was used for hydroforming the same naphtha fraction used in the aforementioned test on the fresh catalyst, the aromatic content of the naphtha increased from 14.3% to only 16.6% by volume.

My invention relates to an improvement in catalytic compositions for use in the above processes for hydrocarbon conversion. Specifically, my invention relates to an improvement in a carrier composition used in the preparation of catalysts for these processes. I have discovered that the inclusion of relatively small amounts of silica on or in the desired carrier, such carrier having distended thereon a compound of the metals as listed above and preferably a compound of chromium, vanadium, molydenum or cobalt or physical and chemical combinations of such compounds, has the effect of greatly improving the heat stability, thus improving the mechanical strength upon calcination and the active life of the catalyst. I have found this to be particularly true in the case of silica when the silica has been included in the catalyst carrier composition consisting primarily of an alumina which has been activated. Compositions containing about 1% to 15% by weight of silica and 85% to 99% by weight of alumina have been found to be excellent carriers on which may be distended 1% to 45% of the oxides of cobalt and molybdenum in the molar ratio of ½ to 5 mols of cobalt oxide to 1 mol of molydenum oxide. Preferably, the amount of silica should be about 5% by weight based on the alumina and silica ingredients although it may be decreased to about 2% or increased to about 9% without substantially changing the preformance of the catalyst. The preferred amount of the combined oxides of cobalt and molybdenum present in the range of molecular proportions as indicated above is about 8 to 20 weight per cent. However, I have found that it may vary in the limits of from about 3% to about 40% with good results.

Thus, while the final composition of the preferred desulfurization catalysts will contain about 76% to 86% by weight of alumina, 4% to 6% by weight of silica and about 8% to 20% by weight of the combined oxides of cobalt and molybdenum in the ratio of about ½ to 5 mols of cobalt oxide to one mol of molybdenum oxide, the catalyst compositions containing about 51% to 95% of alumina, from about 2% to 9% silica and about 3% to 40% of the combined oxides of cobalt and molybdenum present in the above ratio are excellent catalysts. In like manner my preferred catalysts for the reforming of hydrocarbons comprises a carrier composition of 94% to 96% alumina and 4% to 6% silica upon which may be distended the oxides of the metals listed above and preferably chromium, molybdenum or vanadium in the range of about 5% to 20%. I have found, however, that catalysts comprising a carrier composed of from 85% to 99% alumina and from 1% to 15% silica upon which are distended the oxide of the metals as listed above, are also reforming catalysts. Thus the above catalysts include compositions consisting of 1 to 20% of the catalytic agents described above distended on such a carrier.

In accordance with the principles of my invention the catalysts may be prepared by first preparing the carrier consisting of a mixture of alumina and silica and subsequently distending thereon the oxide of a metal whose differentiating electron is in the second from outermost shell such as molybdenum, cobalt, chromium and vanadium oxides or any combination of said oxides, or an alumina carrier may be first coated or impregnated with silica followed by impregnation with one or more of the above metal oxides.

In preparing a catalyst according to a first method the carrier containing the silica may be prepared by coprecipitating the oxides or hydrous oxides of aluminum and silica from aqueous solutions of water soluble salts of these substances. Hereinafter the word oxide is intended to include not only a metal oxide but any hydrous form of a metal oxide. Thus, solutions containing appropriate proportions of the water soluble salts of aluminum, such as the chlorides, nitrates, sulfates, alkali metal aluminates such as sodium aluminate and the like, and silicon such as the alkali metal silicates are treated with ammonia, one of the alkali metal hydroxides or carbonates, carbon dioxide, or acid to precipitate a mixture of silicon and aluminum oxides. Thus, if a salt of alumina is employed which has a pH of less than 7.0 in aqueous solution such as the nitrate, sulfate or chloride, the addition of an alkali metal silicate such as sodium silicate to the aqueous solution of said salt will precipitate aluminum and silicon oxides which may be followed by the addition of ammonia or one of the alkali metal hydroxides to precipitate the excess alumina as the oxide. If an aqueous solution of an alkali metal aluminate and an alkali metal silicate is employed the coprecipitation of the oxides may be accomplished by the addition to said solution of an alkali metal carbonate, such as sodium, potassium, lithium carbonates, carbon dioxide or an acid, such as sulfuric acid, nitric acid, etc. The precipitate is washed several times with water to remove the water-soluble impurities and then dried, or the water washing or leaching process may be carried out both before and after the drying process. The primary drying operation is preferably effected at temperatures in the order of 100–500° F. and this is followed by calcining at higher temperatures in the order of 750° F. to 1200° F. or higher. The thus prepared carrier which may be pilled, pelleted, extruded or otherwise shaped as well as in the form of granules or powder, is impregnated with an oxide or combination of the oxides of the metals whose differentiating electron is in the second from outermost shell and preferably with an oxide or combination thereof of molybdenum, chromium, cobalt or vanadium. This impregnation is preferably carried out by immersing the carrier in a suitably concentrated aqueous solution of a suitable salt of the desired metal or metals, such as ammonium dichromate, ammonium molybdate, cobalt nitrate, chromium nitrate, ammonium vanadate or the like, followed by the removal of the salt solution in excess of that adsorbed by the carrier, said removal being carried out by decantation, filtration or by centrifuging or the like. The impregnated catalyst is preferably dried at two temperature levels. The primary drying is effected at lower temperature in the order of 100–500° F. and the final drying is accomplished at higher temperature in the order of 750° F. to 1200° F. or even higher. The heating or calcination at such temperatures, with or without hydrogen, air, or other reducing or oxidizing agent being present, results in converting the adsorbed salts to the corresponding oxides.

As a second method of catalyst preparation, the hydrous gel of alumina and silica may be resuspended in distilled water to which suspension may be added aqueous solutions of the soluble salts of the above mentioned metals such as cobalt nitrate, ammonium molydate and the like, these metals being precipitated from the resulting suspension in the form of oxides, or combined oxides by adjusting the pH through the addition of a suitable base to a value greater than seven. The entire suspension is vigorously agitated during the precipitation effecting a large degree of dispersion of the precipitated oxides in the suspended alumina-silica gel. The gelatinous mixture is then water washed to remove water soluble impurities and dried at the two temperature levels as described above.

As a third method of catalyst preparation, the alumina-silica carrier may be prepared by grinding or otherwise powdering and intimately mixing the desired proportions of alumina and silica and this mixture may then be pilled or pelleted with or without the use of a lubricant followed, if necessary, by a calcining treatment to remove the lubricant. The carrier may then be impregnated with a catalytic agent as described above.

In preparing a catalyst according to a fourth method, an alumina which has been activated, or an alumina prepared by precipitating aluminum oxide from an aqueous solution of an aluminum salt by conventional methods, washing to remove water soluble impurities, and drying according to the method described in the above carrier preparation, is first coated with silica to produce the catalyst carrier. The freshly calcined alumina is impregnated with silica by immersing it in a suitably concentrated solution of a water soluble salt of silica such as the alkali metal silicates and the like or in an aqueous suspension or solution of hydrous silicon oxide. The impregnated alumina is dried and calcined at the two temperature levels indicated above in order to convert the silicon salt or hydrous oxide to silica. The thus prepared catalyst carrier, consisting of alumina impregnated with silica may then be further impregnated with a catalytic material such as the oxide or combined oxides of one or more of the metals whose differentiating electron is in the second from outermost shell according to the procedure described above for impregnating the alumina-silica carrier. In catalyst compositions in which the oxides of the alkaline earth metals are undesirable the use of hydrous silicon oxide is indicated for the carrier preparation in the above procedure or the preparation may be accomplished by the following modification of this procedure.

The water insoluble or hydrolyzable salts of silica such as silicon, tetrachloride, silicon bromide, silicon sulfide, silicon sulfochloride and the like may be employed for the impregnation of alumina by the use of suitable solvents for these compounds. Such solvents as the paraffin hydrocarbons, aromatic hydrocarbons, carbon tetrachloride, carbon disulfide, and the like are good solvents for the above compounds and are readily removed from the alumina by heat. Thus, for example, an activated alumina may be impregnated with silica by immersing said alumina in a solution of silicon tetrachloride in a petroleum hydrocarbon fraction, removing the unadsorbed solution and partially drying the alumina by suspending the granules or pills on a Buchner funnel and causing air to pass through the bed by the application of a partial vacuum below the funnel. This impregnated and partially dried alumina may then be worked into a finished catalyst by the above described method.

Whether or not the catalyst is prepared by impregnating the alumina base containing the silica with the salts of the desired metals followed by conversion to the oxides in accordance with the first method described above or whether the catalyst is prepared by precipitating the desired metal oxide in the hydrous gel of alumina and silica will depend in many cases on the particular metal oxide or oxides desired in the finished catalyst. In the case of a catalyst composed of alumina, silica and the combined oxides of cobalt and molybdenum, i. e. cobalt molybdate, particularly when used for desulfurization of petroleum or petroleum fractions. I have found that the catalyst prepared according to the first method described above is far superior to one produced by the second method described above as will be shown hereinafter in Example 1.

The invention may perhaps be best understood by reference to the following examples which should be considered as only illustrative of the invention and not to be taken as in any way limiting my invention.

EXAMPLE 1

In order to demonstrate the effects of silica content and methods of preparation on the activity and heat stability of the desulfurization catalyst hereinbefore described, four samples of catalysts were prepared as follows:

Catalyst No. 1

19.35 pounds of hydrous silica-free alumina gel was suspended in 10 liters of distilled water to which was added with constant agitation over a period of one hour a solution of 155 grams of cobalt nitrate $(Co(NO_3)_2 \cdot 6H_2O)$ in 645 ml. of distilled water. A second solution was prepared comprising 94 grams of ammonium molybdate $((NH_4)_2MoO_4)$ in 710 ml. of distilled water to which was added 71 ml. of 28.5% ammonium hydroxide solution. This solution was added slowly to the alumina suspension subsequent to the addition of the cobalt nitrate while the latter was being vigorously agitated effecting the precipitation of the combined oxides of cobalt and molybdenum on the suspended alumina. The mixture was further stirred for one hour and filtered after which the cake was resuspended in 10 liters of distilled water and again filtered. The catalyst was washed three times in this manner to remove the water-soluble impurities and then dried for two days at 100° C. and for two hours at 500° C. The resultant gel was a dark, vitreous, highly adsorptive material having the following composition:

| Component: | Wt. per cent |
|---|---|
| Alumina as $Al_2O_3$ | [1] 91.4 |
| Silica as $SiO_2$ | 0 |
| Cobalt molybdate as $CoO.MoO_3$ | 8.6 |

[1] By difference.

Catalyst No. 2

Catalyst No. 2 was prepared in the same manner as catalyst No. 1 with silica being added to the hydrous alumina as silicon tetrachloride prior to the coprecipitation of the cobalt and molybdenum. This catalyst had the following composition:

| Component: | Wt. per cent |
|---|---|
| Alumina as $Al_2O_3$ | [1] 86.8 |
| Silica as $SiO_2$ | 4.8 |
| Cobalt molybdate as $CoO.MoO_3$ | 8.4 |

[1] By difference.

Catalyst No. 3

To 20 pounds of hydrous alumina gel (about 10% $Al_2O_3$) employed in the preparation of catalyst No. 1, which had been suspended in 10 liters of distilled water was slowly added 4.1 pounds of silicon tetrachloride, the entire mixture being vigorously agitated during the addition. The pH of the suspension was maintained above 8 with ammonium hydroxide. The resultant gel was filtered, washed and dried as in the above example to give a vitreous, highly adsorptive carrier composed of approximately 95% $Al_2O_3$ and 5% $SiO_2$. A solution was prepared comprising 399 grams of cobalt nitrate and 241.5 grams of ammonium molybdate in 500 ml. of distilled water and 1700 ml. of concentrated ammonium hydroxide and 2000 grams of the above carrier were immersed in this solution for a period of ten minutes during which time the mixture was stirred continuously. The excess solution was then filtered from the catalyst on a Buchner type filter funnel, the catalyst was dried overnight at 110° C. and for 6 hours at 600° C. The finished catalyst had the following composition:

| Component: | Wt. per cent |
|---|---|
| Alumina as $Al_2O_3$ | 88.0 |
| Silica as $SiO_2$ | 5.0 |
| Cobalt molybdate as $CoO.MoO_3$ | 7.0 |

Catalyst No. 4

This catalyst was prepared from the dried hydrous alumina gel without added silica in the same manner as catalyst No. 2 and had the following composition:

| Component: | Wt. per cent |
|---|---|
| Alumina as $Al_2O_3$ | 91.3 |
| Silica as $SiO_2$ | 0 |
| Cobalt molybdate as $CoO.MoO_3$ | 8.7 |

Catalysts 1, 2 and 3 were then employed when fresh and after calcination at 800° C. for desulfurizing heavy gas oil from Santa Maria crude containing 2.3 weight per cent sulfur under the following conditions: Isothermal block temperature of 700° F., 150 pounds per square inch gauge pressure, 3000 cubic feet of added hydrogen per barrel of feed, a liquid hourly space velocity of 1.0, and a twelve hour process period. Pertinent data from these runs are tabulated below:

Table

| Catalyst No. | 1 | | 2 | | 3 | | 4 | |
|---|---|---|---|---|---|---|---|---|
| Method of preparation | Coprecipitation | | Coprecipitation | | Impregnation | | Impregnation | |
| $CoO.MoO_3$, wt. per cent | 8.6 | | 8.4 | | 7.0 | | 8.7 | |
| $SiO_2$, wt. per cent | 0 | | 4.8 | | 5.0 | | 0 | |
| Calcination temp., ° C. | Fresh | 800 | Fresh | 800 | Fresh | 800 | Fresh | 800 |
| Sulfur in feed, wt. per cent | 2.3 | 2.3 | 2.3 | 2.3 | 2.3 | 2.3 | 2.3 | 2.3 |
| Sulfur in product, wt. per cent | 0.30 | 0.50 | 0.31 | 0.42 | 0.23 | 0.30 | 0.20 | 0.40 |
| Per cent Desulfurization | 87.0 | 78.4 | 86.6 | 81.7 | 90.0 | 87.0 | 91.3 | 82.5 |

These data serve to show the stabilizing effect of silica incorporated in the catalyst regardless of preparation method. Thus, the heat stability of catalyst No. 2 is superior to that of catalyst No. 1 and in like manner catalyst No. 3 is superior in this respect to catalyst No. 4. At the same time the above data clearly show the improvement effected in catalyst activity when the impregnation method of preparation is employed.

EXAMPLE 2

A catalyst composed of alumina, silica and molybdenum oxide was prepared as follows: 5,125 grams of commercially activated alumina was immersed in a solution of 1800 grams of silicon tetrachloride dissolved in 5 liters of paraffinic hydrocarbon material. The alumina was stirred therein for a period of five minutes and was removed to a Buchner funnel and partially dried by the passage of air through the alumina. The alumina containing the hydrocarbon and silica was then dried overnight at 250° F. and for two hours at 600° C. The resultant material completely freed of organic matter by the above treatment consisted of 95% alumina and 5% silica. This carrier was in turn immersed in a solution composed of 1,030 grams of ammonium molybdate dissolved in 4 liters of distilled water containing 360 ml. of ammonium hydroxide. The mixture was agitated for a period of 5 minutes and the catalyst was partially dried by the passage of air through a Buchner funnel. The carrier containing the adsorbed ammonium molybdate was dried overnight at 250° F. and for two hours at 600° C. This completed catalyst hereinafter referred to as catalyst No. 5 showed on analysis a composition of approximately 85.4% alumina, 4.4% silica and 10.2% molybdenum oxide.

Portions of this catalyst as prepared and after calcination at 800° C. for six hours were then used to hydroform a petroleum naphtha boiling in the range of about 200° F. to about 280° F. and containing initially 14.3 volume per cent aromatics. The conditions used in hydroforming these two samples were the same and were as follows: liquid hourly space velocity of 1; reactor block temperature of 950° F.; gauge pressure of 100 lbs. per square inch with an added 3,000 cubic feet of hydrogen per barrel of feed at a two hour process period.

The operation carried out with a fresh catalyst resulted in a liquid product yield of 71.5% by volume of the feed and the yield of aromatics increasing to 49.4% by volume based on the feed. The second portion of the catalyst which had been calcined at 800° C. for six hours yielded 73.8 volume per cent of a liquid product and 50% by volume of aromatics. These data revealed that this catalyst suffered no loss in hydroforming activity as a result of the calcination treatment and at the same time it was noticed that the calcined sample possessed slightly greater strength than the fresh catalyst. It will be noted that although the presence of the silica only slightly increases the initial activity of the catalyst, its greatest effect is to stabilize and cause the catalyst to retain its activity and strength even after severe heat treatment.

While the catalysts described in the above examples are of the aromatizing and desulfurizing type and are composed of alumina and a catalytic agent as the catalyst and silica as the stabilizer, it is within the spirit of my invention to use silica as the stabilizer in other catalysts for the treatment of hydrocarbons. I prefer to employ these catalysts which use as supports such solid adsorbent materials as alumina, magnesia, zirconia and the like and upon which are distended one or more of the oxides of the related metals possessing their differentiating electron in the second from outermost shell.

Moreover, the hydroforming and desulfurization operations described in the above examples are only illustrative of the possible uses of catalysts stabilized in the various manners outlined above and it is within the scope of this invention to use any or all of the above types of catalysts in carrying out the process or processes generally termed dehydrogenation, hydroforming, desulfurization, hydrogenation, cracking, reforming and the like.

Any or all of the above named processes for the treatment of hydrocarbons may be carried out at selected temperatures in the range of about 600° F. to about 1,300° F. and under gauge pressures of about —14 pounds to about 1,500 pounds per square inch using catalysts having the compositions disclosed above which have been prepared according to the principles outlined in the foregoing description.

The foregoing disclosure of my invention is not to be considered as limiting since many variations may be made by those skilled in the art without departing from the scope of the claims or the spirit thereof.

I claim:

1. A catalyst comprising 80 to 99% by weight of a carrier, the balance being a catalytic agent distended on said carrier, said carrier consisting of an activated alumina gel containing between about 1% and about 15% of silica precipitated in the presence of the entire hydrous precipitated alumina gel, and said catalytic agent comprising essentially an oxide of a metal selected from the class consisting of the related metals which have their differentiating electron in the second from the outermost shell.

2. A catalyst according to claim 1 in which the catalytic agent consists of cobalt oxide and molybdenum oxide in the molecular proportion of one-half to five moles of cobalt oxide to one mole of molybdenum oxide.

3. A catalyst according to claim 1 in which the catalytic agent is molybdenum oxide.

4. A catalyst according to claim 1 in which the catalytic agent consists of vanadium oxide.

5. A catalyst according to claim 1 in which the catalytic agent consists of chromium oxide.

6. A catalyst according to claim 1 in which the silica is coprecipitated with the alumina.

HAL C. HUFFMAN.

REFERENCES CITED

The following references are of record in the file of this patent:

UNITED STATES PATENTS

| Number | Name | Date |
|---|---|---|
| 1,672,528 | Heissler | June 5, 1928 |
| 2,214,455 | Egloff et al. | Sept. 10, 1940 |
| 2,216,262 | Bloch et al. | Oct. 1, 1940 |
| 2,267,767 | Thomas | Dec. 30, 1941 |
| 2,296,406 | Spicer et al. | Sept. 22, 1942 |
| 2,325,033 | Byrns | July 27, 1943 |
| 2,325,287 | Thomas | July 27, 1943 |
| 2,374,404 | Ahlberg | Apr. 24, 1945 |
| 2,375,402 | Corson et al. | May 8, 1945 |
| 2,394,516 | Goshorn | Feb. 5, 1946 |
| 2,395,836 | Bates | Mar. 5, 1946 |